(12) United States Patent
Chui

(10) Patent No.: US 8,437,071 B2
(45) Date of Patent: May 7, 2013

(54) INTERFEROMETRIC MODULATOR ARRAY WITH INTEGRATED MEMS ELECTRICAL SWITCHES

(75) Inventor: Clarence Chui, San Jose, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 0 days.

(21) Appl. No.: 13/528,609

(22) Filed: Jun. 20, 2012

(65) Prior Publication Data

US 2012/0256819 A1  Oct. 11, 2012

Related U.S. Application Data

(60) Division of application No. 12/961,402, filed on Dec. 6, 2010, now Pat. No. 8,223,424, which is a division of application No. 12/050,094, filed on Mar. 17, 2008, now Pat. No. 7,859,739, which is a continuation of application No. 11/150,407, filed on Jun. 10, 2005, now Pat. No. 7,345, 805.

(60) Provisional application No. 60/613,501, filed on Sep. 27, 2004.

(51) Int. Cl.
*G02B 26/00* (2006.01)
*G02B 26/02* (2006.01)

(52) U.S. Cl.
USPC .......................................... 359/290; 359/230

(58) Field of Classification Search ............... 359/198.1, 359/224.1, 230, 247, 290–292; 345/85, 598–600; 356/454
See application file for complete search history.

(56) References Cited

U.S. PATENT DOCUMENTS

| | | | |
|---|---|---|---|
| 4,954,789 | A | 9/1990 | Sampsell |
| 5,018,256 | A | 5/1991 | Hornbeck |
| 5,099,353 | A | 3/1992 | Hornbeck |
| 5,231,388 | A | 7/1993 | Stoltz |
| 5,367,878 | A | 11/1994 | Muntz et al. |
| 5,481,274 | A | 1/1996 | Aratani et al. |
| 5,483,260 | A | 1/1996 | Parks et al. |
| 5,613,103 | A | 3/1997 | Nobutani et al. |
| 5,619,061 | A | 4/1997 | Goldsmith et al. |
| 5,650,834 | A | 7/1997 | Nakagawa et al. |
| 5,784,189 | A | 7/1998 | Bozler et al. |
| 5,929,831 | A | 7/1999 | Aratani et al. |
| 6,037,719 | A | 3/2000 | Yap et al. |

(Continued)

FOREIGN PATENT DOCUMENTS

| | | |
|---|---|---|
| JP | 2002 175053 | 6/2002 |
| JP | 2004-205973 | 7/2004 |
| JP | 2004 004553 | 8/2004 |

OTHER PUBLICATIONS

Hirata et al., 1999, A micromechanical switch as the logic elements for circuits in multi chip module in Si (MCM-Si), 12th IEEE International Conference on Micro Electro Mechanical Systems, pp. 582-587.

(Continued)

*Primary Examiner* — William Choi
(74) *Attorney, Agent, or Firm* — Knobbe Martens Olson & Bear LLP

(57) ABSTRACT

An array of display elements, such as interferometric modulators, is integrated with collapsible cavity microelectromechanical system (MEMS) electrical switches. The electrical switches and the display elements may be at least partially formed with the same manufacturing operations. The switches may form row or column select functions for the display elements.

24 Claims, 12 Drawing Sheets

U.S. PATENT DOCUMENTS

| | | | |
|---|---|---|---|
| 6,040,937 | A | 3/2000 | Miles |
| 6,246,398 | B1 | 6/2001 | Koo |
| 6,323,982 | B1 | 11/2001 | Hornbeck |
| 6,327,071 | B1 | 12/2001 | Kimura |
| 6,433,917 | B1 | 8/2002 | Mei et al. |
| 6,466,486 | B2 | 10/2002 | Kawasumi |
| 6,483,395 | B2 | 11/2002 | Kasai et al. |
| 6,552,840 | B2 | 4/2003 | Knipe |
| 6,574,033 | B1 | 6/2003 | Chui et al. |
| 6,650,455 | B2 | 11/2003 | Miles |
| 6,674,562 | B1 | 1/2004 | Miles et al. |
| 6,680,792 | B2 | 1/2004 | Miles |
| 6,710,908 | B2 | 3/2004 | Miles et al. |
| 6,750,876 | B1 | 6/2004 | Atsatt et al. |
| 6,781,643 | B1 | 8/2004 | Watanabe et al. |
| 6,813,060 | B1 | 11/2004 | Garcia et al. |
| 6,825,835 | B2 | 11/2004 | Sano et al. |
| 6,903,860 | B2 | 6/2005 | Ishii |
| 7,110,158 | B2 | 9/2006 | Miles |
| 7,123,216 | B1 | 10/2006 | Miles |
| 7,161,728 | B2 | 1/2007 | Sampsell et al. |
| 7,196,837 | B2 | 3/2007 | Sampsell et al. |
| 7,283,112 | B2 | 10/2007 | Starkweather et al. |
| 7,345,805 | B2 | 3/2008 | Chui |
| 7,471,444 | B2 | 12/2008 | Miles |
| 7,532,194 | B2 | 5/2009 | Chui |
| 7,889,163 | B2 | 2/2011 | Chui et al. |
| 2002/0000959 | A1 | 1/2002 | Colgan et al. |
| 2002/0054424 | A1 | 5/2002 | Miles et al. |
| 2002/0179421 | A1 | 12/2002 | Williams et al. |
| 2003/0043157 | A1 | 3/2003 | Miles |
| 2004/0051929 | A1 | 3/2004 | Sampsell et al. |
| 2006/0066553 | A1 | 3/2006 | Deane |
| 2008/0191742 | A1 | 8/2008 | Bertin |

OTHER PUBLICATIONS

Notice to Submit a Response dated Jul. 27, 2012 in Korean patent app. No. 10-2012-0066149.
Miles, MEMS-based interferometric modulator for display applications, Part of the SPIE Conference on Micromachined Devices and Components, 3876:20-28 (1999).
Miles et al., 2000, 5.3: Digital Paper™: Reflective displays using interferometric modulation, SID Digest, vol. XXXI, pp. 32-35.
Office Action dated Apr. 24, 2007 in U.S. Appl. No. 11/150,407.
Office Action dated Oct. 11, 2006 in U.S. Appl. No. 11/150,407.
Office Action dated Mar. 12, 2009 in U.S. Appl. No. 12/050,094.
Office Action dated Oct. 22, 2009 in U.S. Appl. No. 12/050,094.
Office Action dated Apr. 9, 2010 in U.S. Appl. No. 12/050,094.
Extended European Search Report for App. No. 05255699.0 dated Jun. 22, 2006.
Office Action dated May 9, 2008 in Chinese App. No. 200510103444.9.
Office Action dated Jan. 16, 2009 in Chinese App. No. 200510103444.9.
Decision of Rejection dated Oct. 14, 2009, 2009 in Chinese App. No. 200510103444.9.
Office Action dated Mar. 22, 2011 in Chinese App. No. 200510103444.9.
Notice of Reasons for Rejection dated Jun. 3, 2008 in Japanese App. No. 2005-232880.
Decision of Rejection dated Sep. 30, 2008 in Japanese App. No. 2005-232880.
Pre-Appeal Examination Report dated Sep. 29, 2009 in Japanese App. No. 2005-232880.
Notice of Reasons for Rejection dated May 11, 2010 in Japanese App. No. 2005-232880.
Notice of Reasons for Rejection dated Sep. 14, 2010 in Japanese App. No. 2009-000342.
Official Action received Nov. 11, 2008 in Russian App. No. 2005129913.
Notice to Submit a Response dated Jan. 17, 2012 in Korean Patent App. No. 10-2005-0087709.
Office Action dated Nov. 25, 2011 in U.S. Appl. No. 12/961,402.
Final Office Action dated May 18, 2012 in Korean Patent App. No. 10-2005-0087709.
Notice to Submit a Response dated Nov. 13, 2012 in Korean application No. 10-2012-0107807.

|  | Column Output Signals | |
|---|---|---|
|  | $+V_{bias}$ | $-V_{bias}$ |
| Row Output Signals  0 | Stable | Stable |
| $+\Delta V$ | Release | Actuate |
| $-\Delta V$ | Actuate | Release |

INTERFEROMETRIC MODULATOR ARRAY WITH INTEGRATED MEMS ELECTRICAL SWITCHES

CROSS REFERENCE TO RELATED APPLICATIONS

This application is a divisional of U.S. patent application Ser. No. 12/961,402, titled "Interferometric Modulator Array With Integrated MEMS Electrical Switches," filed Dec. 6, 2010, which is a divisional of U.S. patent application Ser. No. 12/050,094, now U.S. Pat. No. 7,859,739, titled "Interferometric Modulator Array With Integrated MEMS Electrical Switches," filed Mar. 17, 2008, which is a continuation of U.S. patent application Ser. No. 11/150,407, now U.S. Pat. No. 7,345,805, titled "Interferometric Modulator Array With Integrated MEMS Electrical Switches," filed Jun. 10, 2005, which claims priority to U.S. Provisional Application No. 60/613,501, titled "Interferometric Modulator Array With Integrated MEMS Electrical Switches," filed Sep. 27, 2004, the specifications of which are hereby incorporated by reference, in their entireties.

BACKGROUND

1. Technical Field

The field of the invention relates to microelectromechanical systems (MEMS).

2. Description of the Related Technology

Microelectromechanical systems (MEMS) include micromechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other display devices.

In one embodiment, the invention includes a display device having a MEMS display portion comprising rows and columns of MEMS display elements and a plurality of MEMS switches formed as one or more additional rows or columns of MEMS switch elements adjacent to the display portion. In some embodiments, some of the plurality of collapsible cavity MEMS switches include terminals, an electrode, and a deformable layer responsive to a voltage across the layer and the electrode. The MEMS switches may form in part row or column select circuitry.

Methods of making a MEMS display device include forming rows and columns of MEMS display elements on a substrate and forming one or more rows or columns of MEMS switches the same or a different substrate, at least some of which are coupled to the display.

DETAILED DESCRIPTION

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Figure 1:
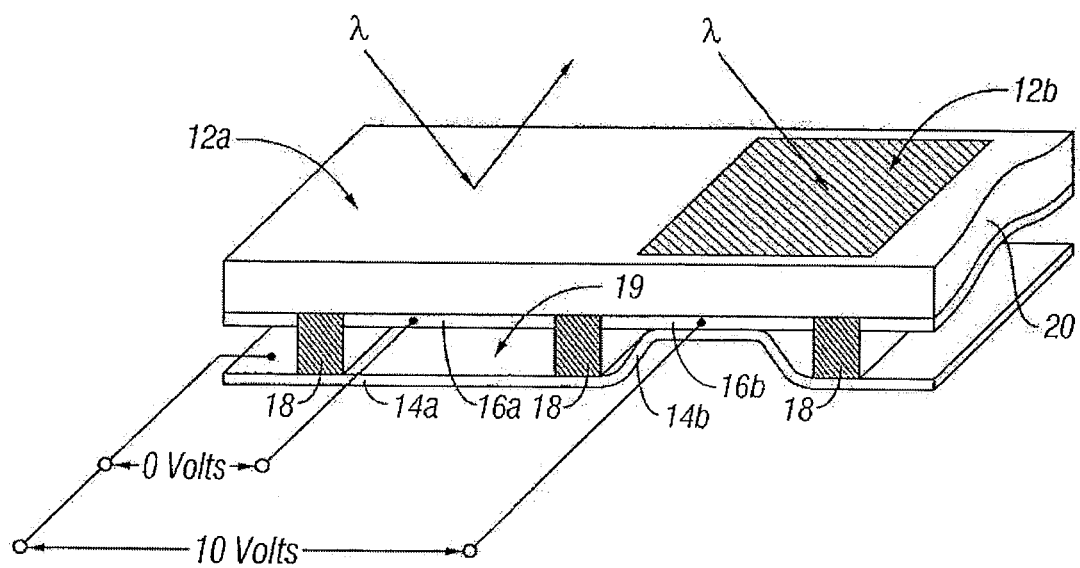
FIG. 1 is an isometric view depicting a portion of one embodiment of an interferometric modulator display in which a movable reflective layer of a first interferometric modulator is in a released position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the relaxed, the movable layer is positioned at a relatively large distance from a fixed partially reflective layer. In the second position, the movable layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable and highly reflective layer 14a is illustrated in a relaxed position at a predetermined distance from a fixed partially reflective layer 16a. In the interferometric modulator 12b on the right, the movable highly reflective layer 14b is illustrated in an actuated position adjacent to the fixed partially reflective layer 16b.

The fixed layers 16a, 16b are electrically conductive, partially transparent and partially reflective, and may be fabricated, for example, by depositing one or more layers each of chromium and indium-tin-oxide onto a transparent substrate 20. The layers are patterned into parallel strips, and may form row electrodes in a display device as described further below. The movable layers 14a, 14b may be formed as a series of parallel strips of a deposited metal layer or layers (orthogonal to the row electrodes 16a, 16b) deposited on top of posts 18 and an intervening sacrificial material deposited between the posts 18. When the sacrificial material is etched away, the deformable metal layers 14a, 14b are separated from the fixed metal layers by a defined gap 19. A highly conductive and reflective material such as aluminum may be used for the deformable layers, and these strips may form column electrodes in a display device.

With no applied voltage, the cavity 19 remains between the layers 14a, 16a and the deformable layer is in a mechanically relaxed state as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable layer is deformed and is forced against the fixed layer (a dielectric material which is not illustrated in this Figure may be deposited on the fixed layer to prevent shorting and control the separation distance) as illustrated by the pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5 illustrate one exemplary process and system for using an array of interferometric modulators in a display application.

Figure 2:
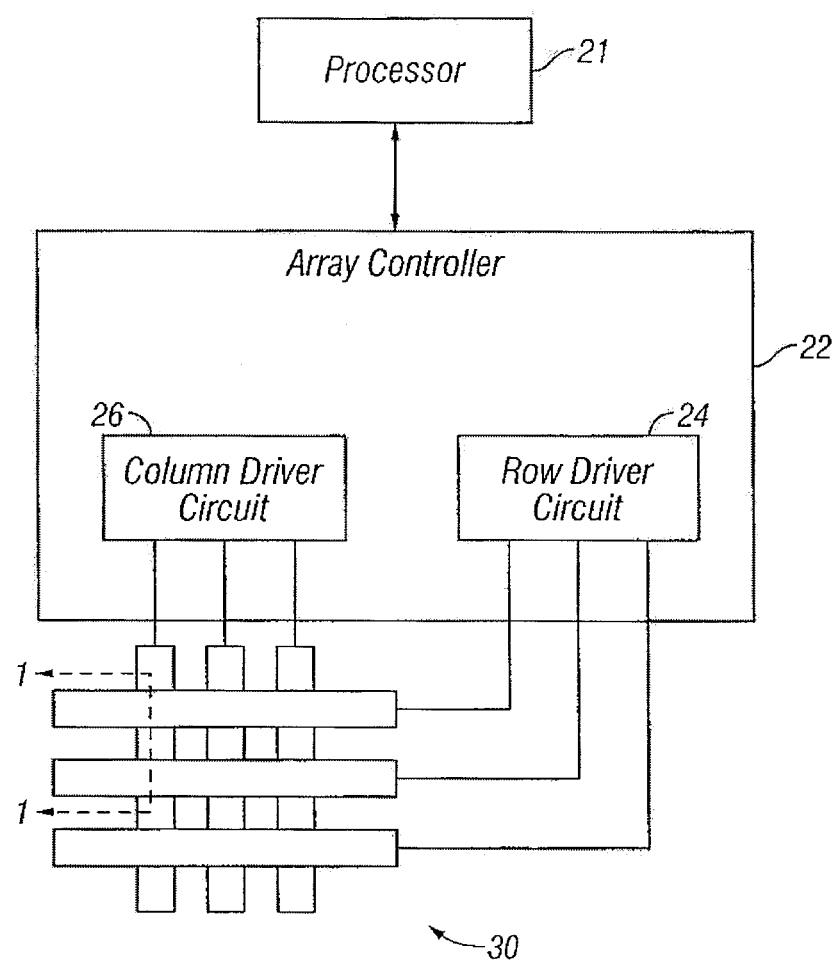
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array controller 22. In one embodiment, the array controller 22 includes a row driver circuit 24 and a column driver circuit 26 that provide signals to a display array or panel 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
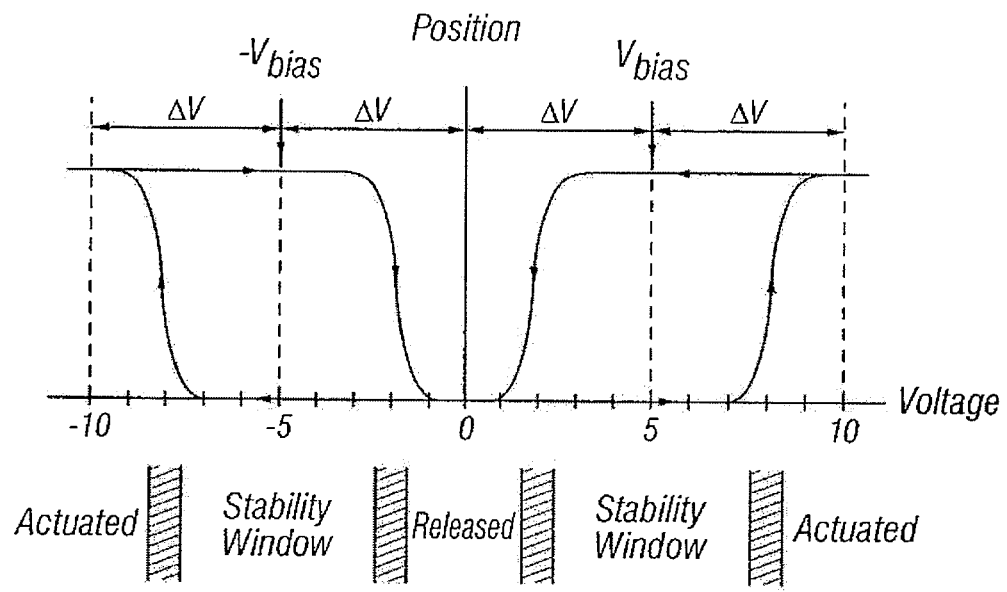
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

Figure 5A:
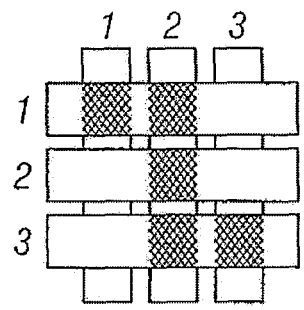
FIGS. 5A and 5B illustrate one exemplary timing diagram for row and column signals that may be used to write a frame of display data to the 3×3 interferometric modulator display of FIG. 2.
Figure 5B:
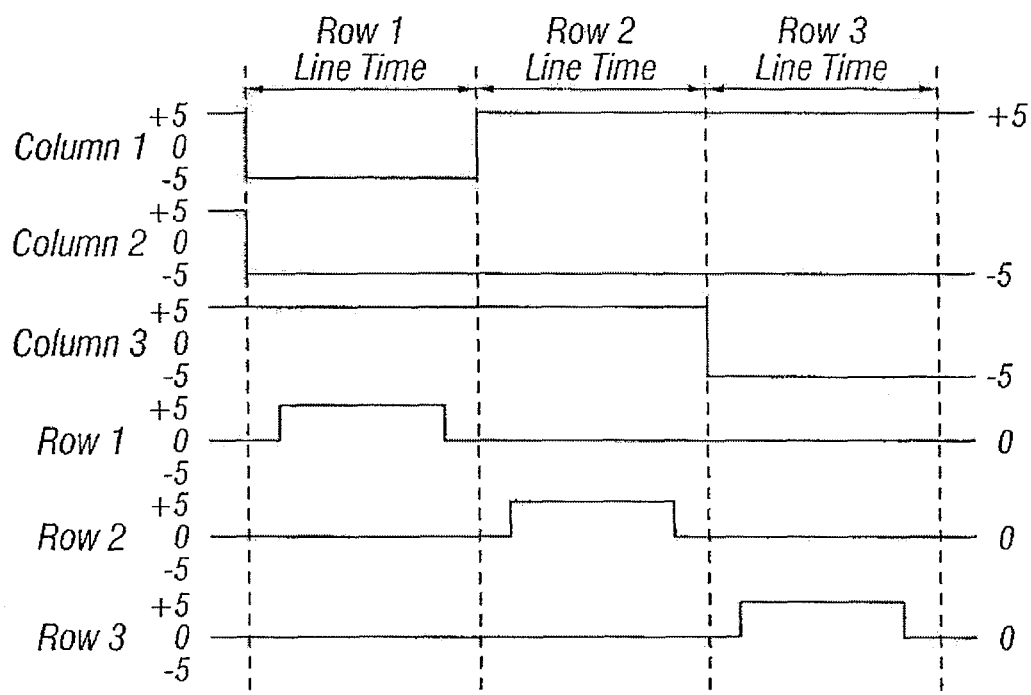

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
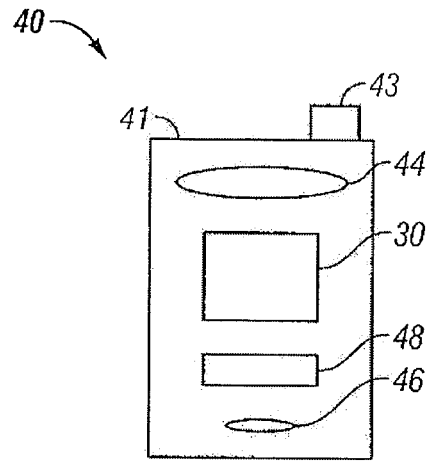
FIG. 6A is a system block diagram illustrating an embodiment of a display device.
Figure 6B:
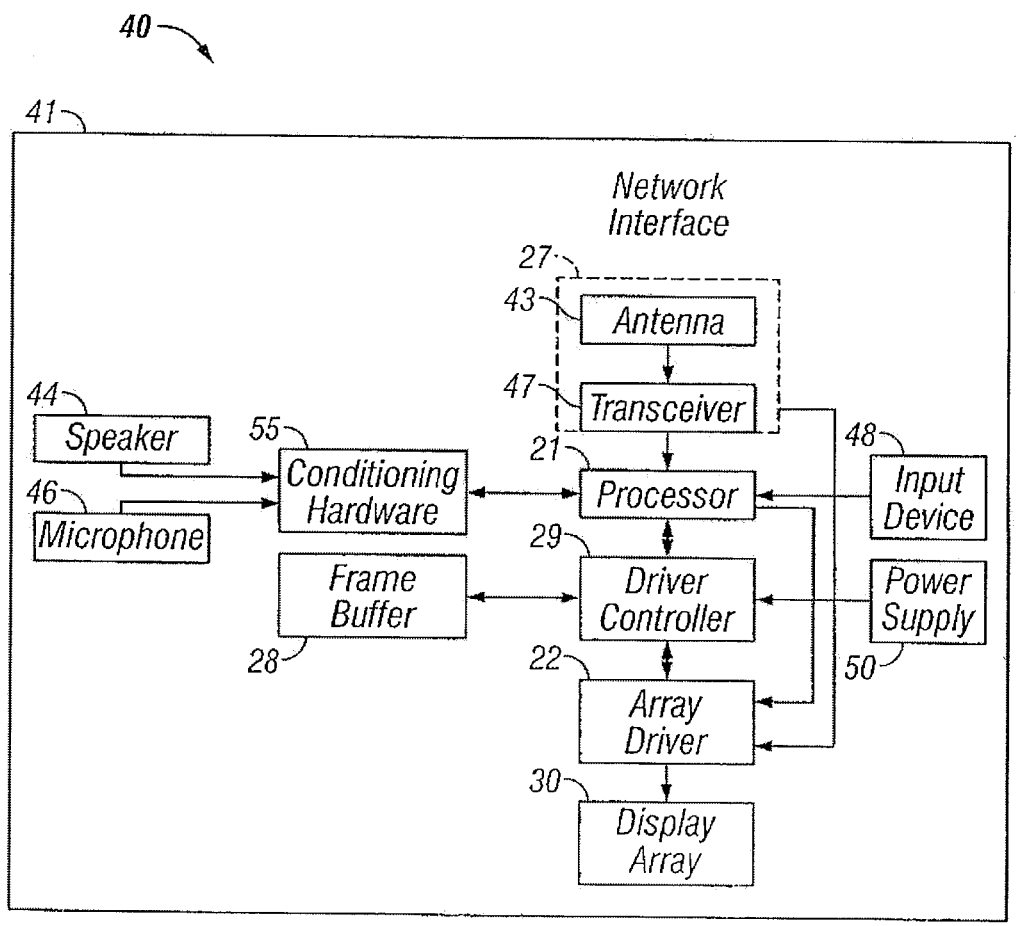
FIG. 6B is a system block diagram illustrating an embodiment of a display device.

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 44, an input device 48, and a microphone 46. The housing 41 is generally formed from any of a variety of manufacturing processes as are well known to those of skill in the art, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g. filter a signal). The conditioning hardware 52 is connected to a speaker 44 and a microphone 46. The processor 21 is also connected to an input device 48 and a driver controller 29. The driver controller 29 is coupled to a frame buffer 28, and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one ore more devices over a network. In one embodiment the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUE-TOOTH standard. In the case of a cellular telephone, the antenna is designed to receive CDMA, GSM, AMPS or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 55 generally includes amplifiers and filters for transmitting signals to the speaker 44, and for receiving signals from the microphone 46. Conditioning hardware 55 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22. Those of skill in the art will recognize that the above-described optimization may be implemented in any number of hardware and/or software components and in various configurations.

Figure 7A:
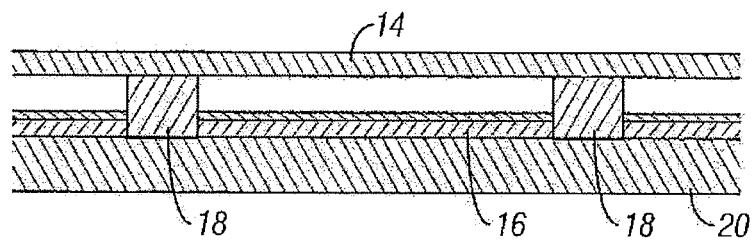
FIG. 7A is a cross section of the device of FIG. 1.
Figure 7B:
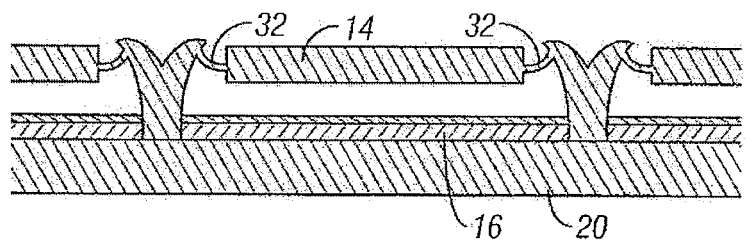
FIG. 7B is a cross section of an alternative embodiment of an interferometric modulator.
Figure 7C:
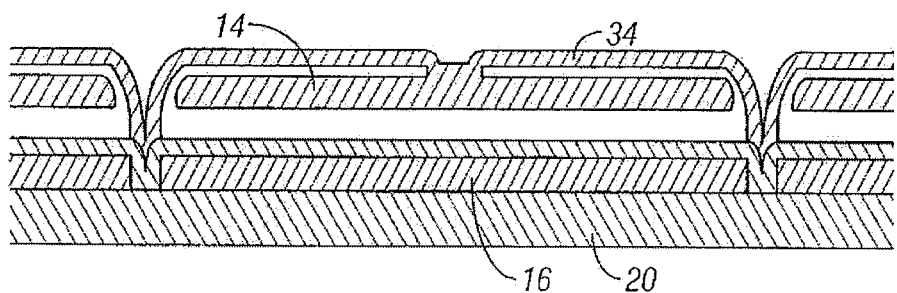
FIG. 7C is a cross section of another alternative embodiment of an interferometric modulator.

The details of the structure of interferometric modulators that operate in accordance with the principles set forth above may vary widely. For example, FIGS. 7A-7C illustrate three different embodiments of the moving mirror structure. FIG. 7A is a cross section of the embodiment of FIG. 1, where a strip of metal material 14 is deposited on orthogonally extending supports 18. In FIG. 7B, the moveable reflective material 14 is attached to supports at the corners only, on tethers 32. In FIG. 7C, the moveable reflective material 14 is suspended from a deformable layer 34. This embodiment has benefits because the structural design and materials used for the reflective material 14 can be optimized with respect to the optical properties, and the structural design and materials used for the deformable layer 34 can be optimized with respect to desired mechanical properties. The production of various types of interferometric devices is described in a variety of published documents, including, for example, U.S. Published Application 2004/0051929. A wide variety of known techniques may be used to produce the above described structures involving a series of material deposition, patterning, and etching steps.

Figure 8A:
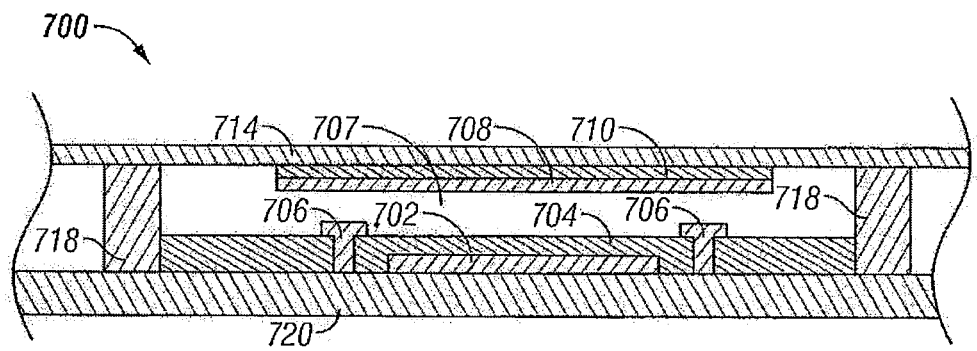
FIGS. 8A and 8B show an embodiment of a MEMS switch

With some modifications the basic structure of an interferometric modulator can be used as a MEMS switch. FIG. 8A is a cross-sectional side view of a MEMS switch 700. The MEMS switch 700 of FIG. 8A has similar collapsible cavity features as the interferometric modulator of FIG. 7A. The MEMS switch 700 additionally includes two terminals 706, an insulating layer 710, and a conductive strip 708. The MEMS switch 700 is a structure that provides selective electrical contact between the two terminals 706. More particularly, the MEMS switch 700 is considered closed when the terminals 706 are in electrical contact and the MEMS switch is considered open when the terminals 706 are not in electrical contact. In a mechanically relaxed state, terminals 706 are not in electrical contact and, thus, the MEMS switch 700 is open. As shown in FIG. 8A, the MEMS switch 700 comprises a moveable material 714, a conductive strip 708, and an insulating layer 710 between the moveable material 714 and the conductive strip 708. A substrate 720 supports an electrode 702, and an insulating layer 704 on the electrode 702. Two terminals 706, separated by a distance, are deposited on and/or through the insulating layer 704. The terminals 706 may connect to other circuitry using vias through insulating layer 704 and/or electrode 702. Insulating layer 704 and moveable material 714 are mechanically separated by supports 718 in order to define a cavity 707. As described above with respect to interferometric modulators, the moveable material 714 is deformable, such that the moveable material 714 may be deformed towards the substrate 720 when a voltage difference is applied across the moveable material 714 and the electrode 702. This is analogous to the reflective material 14, substrate 20, and electrode 16 of FIG. 7A, and to the reflective layers 14a and 14b, the transparent substrate 20, and the reflective layers 16a and 16b of FIG. 1. The moveable material 714 may have on it an insulator 710, which has upon it the conductive strip 708. The conductive strip 708 is aligned so that when the moveable material 714 is deflected towards the substrate 720 by an applied potential as described above, the conductive strip 708 contacts both of the terminals 706, causing the terminals 706 to be in electrical contact and the MEMS switch 700 to be closed. In this embodiment, the conductive strip 708 is electrically isolated from the moveable material 714 by insulator 710 so that contact between the terminals 706 and the movable material 714 does not disturb the voltage difference applied across the moveable material 714 and the electrode 702. In some embodiments, where such isolation is not necessary, the conductive strip 708 and the insulator 710 will not be needed, and the moveable material itself 714 can function as the conductor that bridges the two terminals 706. When the voltage applied across the moveable material 714 and the electrode 702 is reduced below a certain level (as is also described above), the moveable material 714 returns to its mechanically relaxed state and the MEMS switch 700 is opened.

Figure 8B:
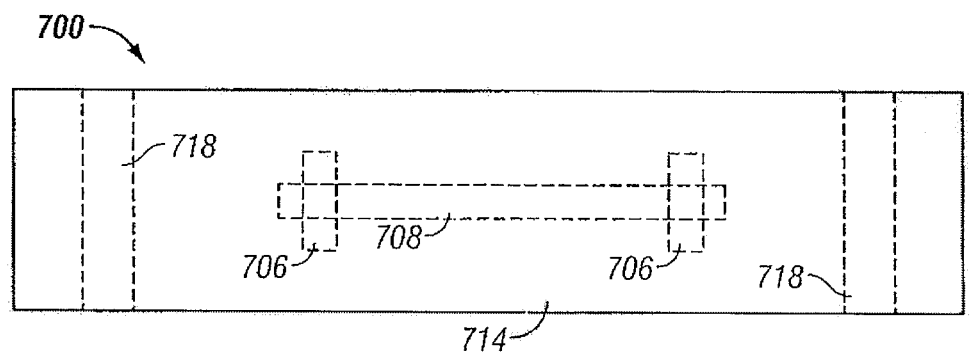

FIG. 8B is a top view of MEMS switch 700. The supports 718, the conductive strip 708, and the terminals 706 are shown as seen looking through the moveable material 714. Conductive strip 708 may be significantly smaller than the moveable material 714. This is to ensure that the electromotive force between the moveable material 714 and the electrode 702 is larger than the electromotive force between the conductive strip 708 and the electrode 702 because once the strip contacts the electrodes, the potential on the strip may differ from the potential on the moveable material.

Figure 9:
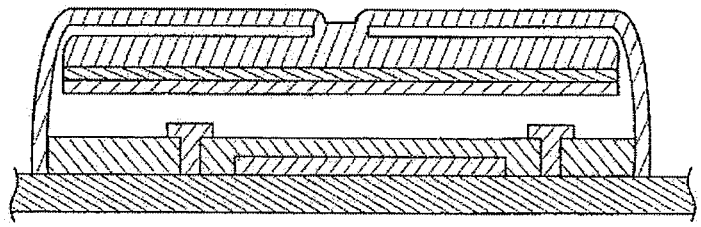
FIG. 9 shows an embodiment of a MEMS switch

FIG. 9 is a cross-sectional side view of a MEMS switch 800 of another embodiment. MEMS switch 800 has similar constructional features as the interferometric modulator of FIG. 7C. It also has MEMS switch functionality and features similar to those of MEMS switch 700 in FIG. 8A.

MEMS switches built from the same basic structure as interferometric modulators ease the integration of logic and switching functions with interferometric modulator arrays. It is possible that the other types of switches may be integrated, such as switches fabricated in a manner not similar to the fabrication of the interferometric elements, and more conventional electronic switches fabricated using thin silicon films deposited on the glass substrate. However, because fabrication of interferometric modulator based MEMS switches may be performed using many of the same processing steps that are used in fabricating interferometric modulators, these MEMS switches may be inexpensively integrated onto the same substrate as an array of interferometric modulators used, for example, for a display.

For example, in one embodiment the MEMS switches and interferometric modulators may be fabricated using the same process, although extra steps may be performed on the interferometric modulators and/or the MEMS switches during the manufacturing process. For example, deposition and etching steps to add terminals to the MEMS switches are unnecessary for the fabrication of interferometric modulators. In such an embodiment some common steps would be performed, such as those for forming the electrodes, etc. The MEMS switch terminals would then be formed. After these steps would follow more steps necessary for both the interferometric modulators and the MEMS switches, thus providing a combined interferometric modulator and MEMS switch array. In yet another embodiment, the same process that is used for manufacturing interferometric modulators is used in manufacturing MEMS switches. The interferometric modulators may first be fabricated on a substrate, followed by fabrication of MEMS switches on the substrate. Similarly, MEMS switches may first be fabricated on a substrate, followed by fabrication of interferometric modulators on the substrate. In either case, the manufacturing process does not require significant modification as the MEMS switches comprise many of the same structures as the interferometric modulators.

Figure 10A:
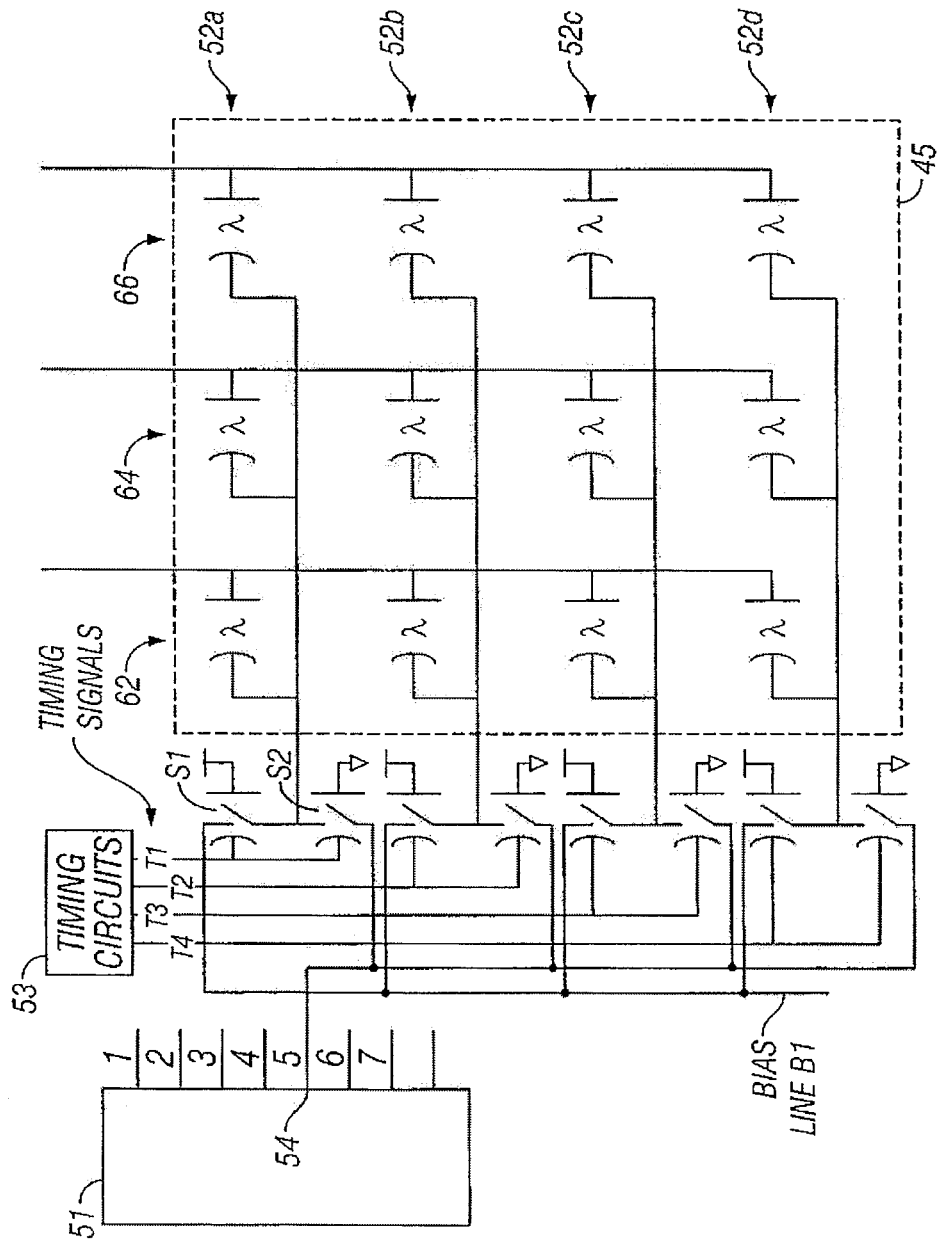
FIGS. 10A and 10B show a circuit illustrating an embodiment of an interferometric modulator array using MEMS switches

FIG. 10A is a schematic circuit diagram illustrating an embodiment of an interferometric modulator array having integrated MEMS switches performing a row select function. This row select function is useful in some display embodiments when it is desired to drive a display having a high row count with a display driver that has fewer row output lines. For example, a display with color pixels may have 3 times as many columns and 4 times as many rows as a black and white display with the same number of pixels. In these color embodiments, each pixel may comprise four red, four blue, and four green modulators. The reflective states of the set of 12 "sub-pixels" determine the perceived color of the pixel as a whole. For this embodiment, four times as many row driver outputs would normally be necessary. However, with the switch configuration illustrated in FIG. 10A (which illustrates one such set of 12 sub-pixels), only one row driver output is necessary for each set of 12 sub-pixels. This embodiment may use MEMS switches of the same embodiment as shown in FIGS. 8A, 8B and 9, however other MEMS switch embodiments are possible. The row select function is used in writing data to the interferometric modulator array. In one embodiment data corresponding to states desired for a specific sub-row in the interferometric modulator array are driven onto the column lines shared by multiple rows and sub-rows. Subsequently, the specific sub-row for which the data is intended is driven active, thereby causing the interferometric modulators in that sub-row to assume the desired states. The principles discussed here could easily be adapted to perform a column select function for this or another embodiment.

A portion of a modulator array is shown in FIG. 10A as display region 45. The term display region has been introduced here to specify a certain area of the entire display. The display region is a collection of display elements that typically resolve into a portion of the display presenting a coherent set of image information. A typical display region would correspond to a single pixel in the resulting image. The display region 45 in FIG. 10A comprises three columns, 62, 64, and 66, typically one for each color such as red, green and blue, in the case where display region 45 represents a pixel;

and one row, comprising 4 sub-rows 52a-d. Each sub-row 52a-d comprises an interferometric modulator from each of the three columns, and a pair of MEMS switches. Driver device 51 has one output pin per modulator array row, and a row connection is provided between each driver device 51 output pin and a corresponding row in the modulator array. Row 5 is illustrated in FIGS. 10A and 9B.

The row select outputs of driver device 51 become active in a sequential pattern starting with row 1, then proceeding to row 2 and so on, thereby selecting one active row at a time. Timing circuit 53 sequentially drives each of the timing lines active for a portion of the time that the driver device 50 drives a row active, thereby selecting an active sub-row one at a time. While a timing signal is active the MEMS switch connected to that timing signal and also connected to the bias line B1 will be open, and the MEMS switch connected to that timing signal and also connected to the row connection will be closed. The signal on the row connection will pass to interferometric modulators of the sub-row 52a-d. Interferometric modulators of an individual sub-row 52a-d will be active when: 1) the driver device 51 drives active the row associated with the sub-rows 52a-d, and 2) the timing circuit 53 drives active the timing signal t1-t4 associated with that particular sub-row 52a-d.

For example, in FIG. 10A, while the driver device 50 drives output row 5 active, the timing circuit 53 will sequentially drive each of the timing signals t1-t4 active, each for ¼ of the time that the row 5 signal is active. While the timing circuit 53 is driving timing signal t1 active the MEMS switch s1 will be open and the MEMS switch s2 will be closed. The interferometric modulators of sub-row 52a will be connected to the row connection driven by driver device 50 output row 5. Because output row 5 is active, the interferometric modulators of sub-row 52a will be driven active. The remaining sub-rows will remain connected to the bias line B1. Timing circuit 53 will then drive timing signal t2 active, the interferometric modulators of sub-row 52b will be connected to the row connection driven by output row 5, and will be driven active. This sequence continues until the sub-rows 52a-d have each been driven active. Then this sequence repeats for rows 6, 7, and so on.

As shown in FIG. 10A the timing signals are shared with all other rows in a column, so that switches for the first sub-row of every row toggle when the first sub-row of any row is active, and so on for the second, third, and fourth sub-rows. However, only the driver output pin for the active row is driven active. All non-active rows are held to a bias voltage while the active row is driven active. In this manner, elements in all sub-rows of the entire array except the active sub-row see the same bias voltage independent of the status of the timing signals and consequently independent of the positions of the switches within the sub-row. It should be observed that switching of the non-active row-select switches could be avoided with masking circuits in cases where further reductions in low power consumption are desired.

Figure 10B:
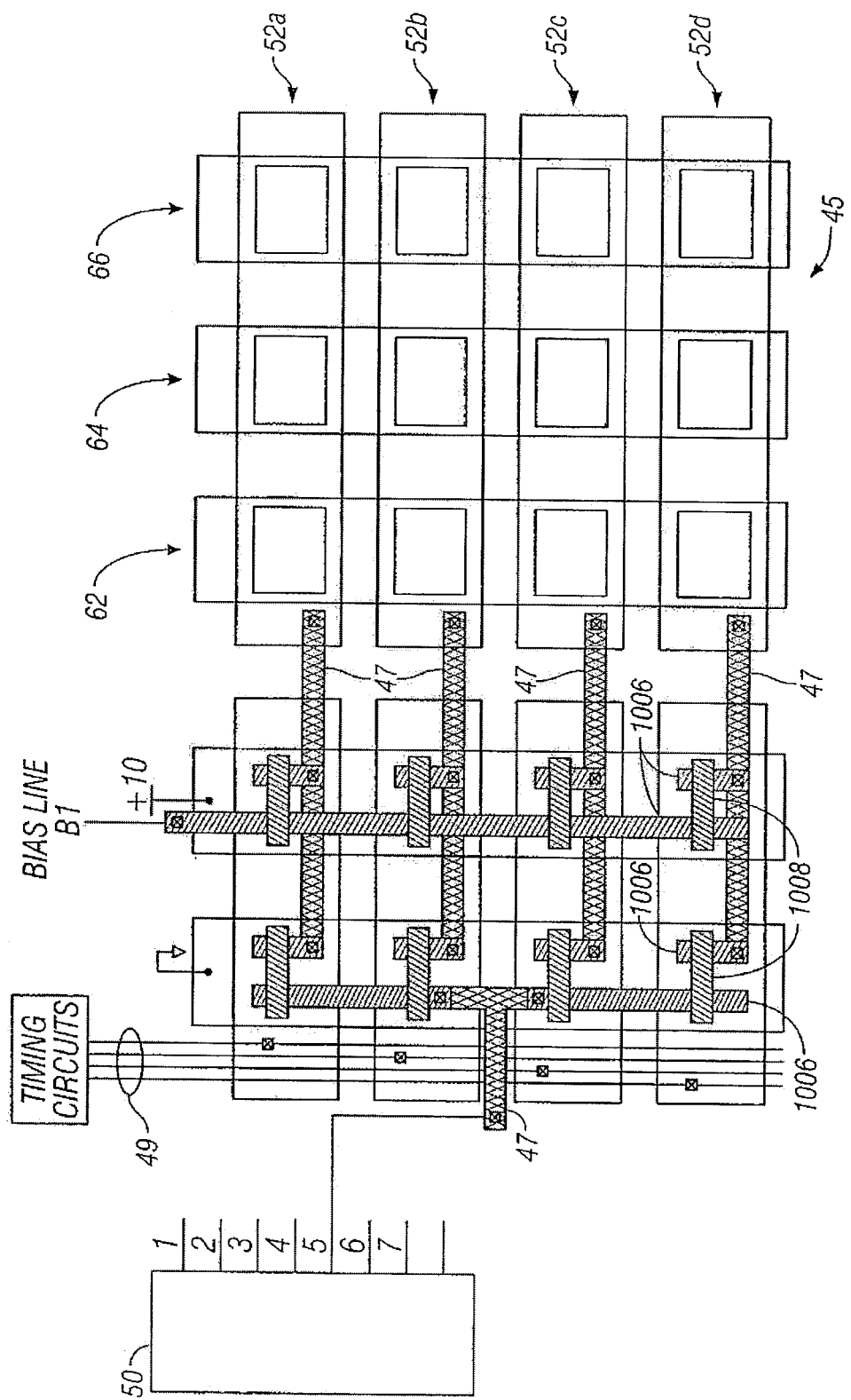

FIG. 10B shows the circuit of FIG. 10A with the interferometric modulators of display region 45 and the MEMS switches in physical layout view. The columns 62, 64, 66, and the sub-rows 52a-d are indicated. The conductive strip 1008, and the terminals 1006 for each of the MEMS switches are shown as seen looking through the moveable material 1014. Also shown are interconnect traces 47 to connect the MEMS switches according to the schematic shown in FIG. 10A. Portions of the interconnect routing can be performed underneath the fixed electrodes. The traces for the timing lines 49 can be routed beneath those, or even on the bottom of the substrate. Connections can be made with vertical vias.

The ease of integration is particularly evident in FIG. 10B. Because they have similar physical features, the MEMS switches can be fabricated to be the same size as the interferometric modulators. As such, the pitch of the MEMS switches is matched to the pitch of the interferometric modulators. This pitch matching is particularly useful for this embodiment, as well as others which provide signals to each row or to each column. The necessary routing is also conveniently integrated with the interferometric modulators as it can be manufactured using standard metallization interconnect fabrication techniques.

Figure 11A:
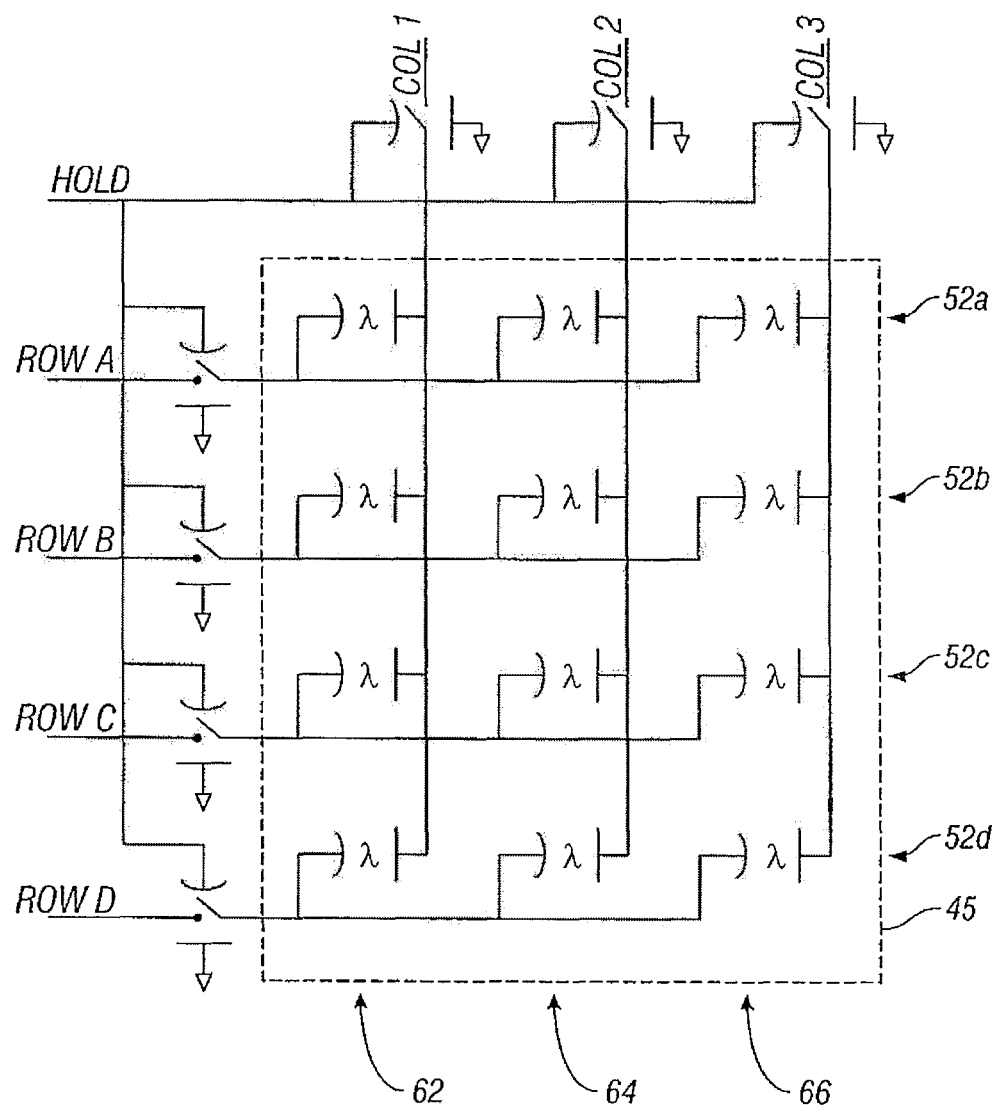
FIGS. 11A and 11B show a circuit illustrating an embodiment of an interferometric modulator array using MEMS switches

FIG. 11A is a schematic circuit diagram illustrating another embodiment of an interferometric modulator array having integrated MEMS switches. In this embodiment the MEMS switches perform a tri-state function. This embodiment shows MEMS switches of the same embodiment as that shown in FIGS. 8A, and 8B, however other MEMS switch embodiments are possible. The tri-state function is useful in the interferometric modulator array system for power savings. While the row and column lines are tri-stated the circuitry used to drive those lines can be powered down. With row and column lines tri-stated, the interferometric modulators in the array will hold the values written to them until the charge slowly dissipates, either across the interferometric modulators or through a non-infinite tri-state open resistance. Because the interferometric modulators can be charged in a small fraction of the time it takes for the charge to dissipate, the driving circuitry can be powered down during a significant fraction of the total display operation time.

A portion of a modulator array is shown in FIG. 11A as display region 40, comprising three columns, 42, 44, and 46, typically one for each color such as red, green and blue, in the case where display region 40 represents a pixel; and one row, comprising 4 sub-rows 52a-d. Each column comprises a column tri-state MEMS switch, and one interferometric modulator from each sub-row. Each sub-row 52a-d comprises an interferometric modulator from each of the three columns, and a sub-row tri-state MEMS switch.

Each of the column and sub-row tri-state MEMS switches is connected to a signal, HOLD. The state of the HOLD signal will determine whether or not the column and sub-row lines are tri-stated or whether the columns and sub-rows are driven.

Figure 11B:
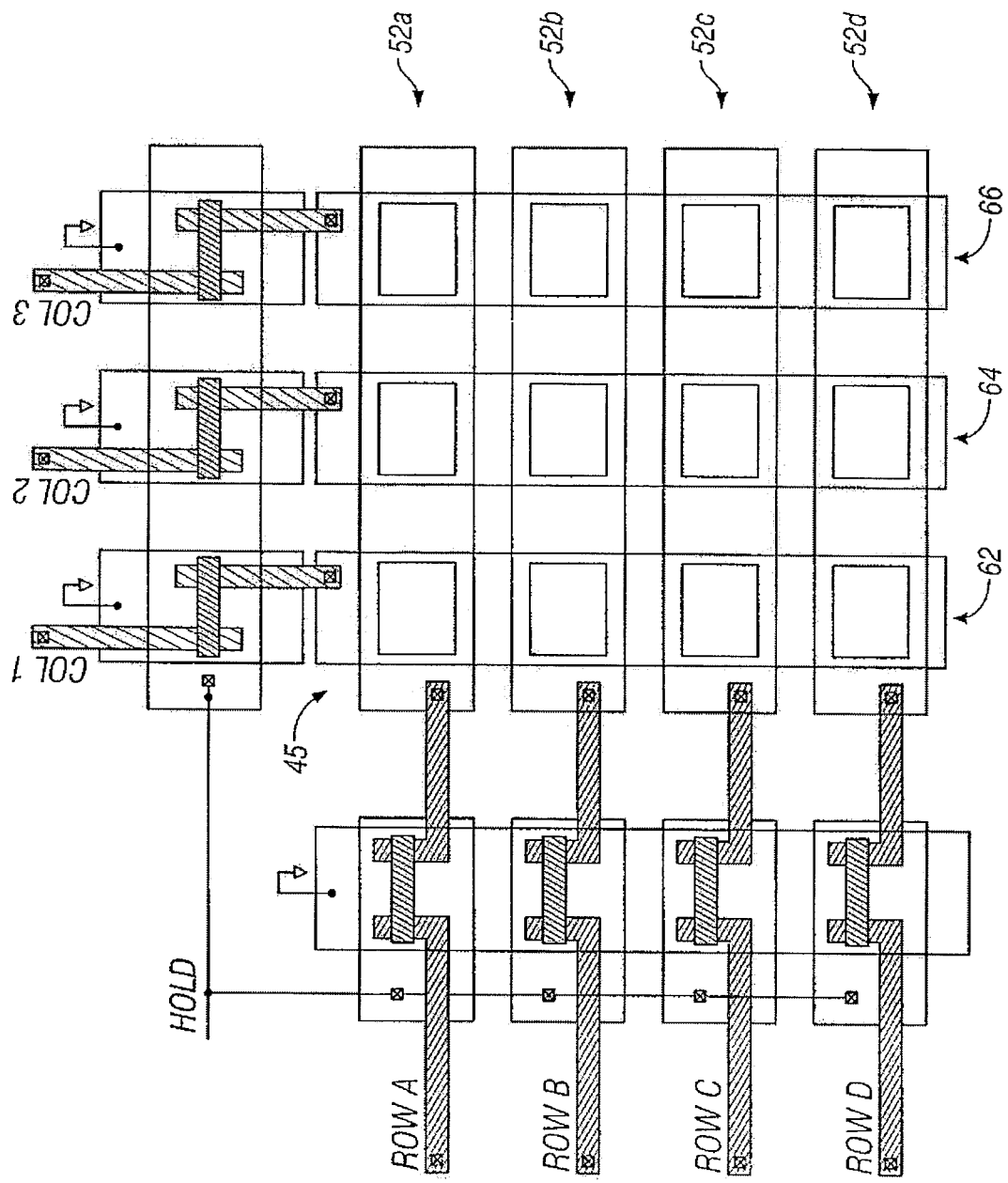

FIG. 11B shows the circuit of FIG. 11A with the interferometric modulators of display region 40 and the MEMS switches in physical layout view. FIG. 11B is similar to FIG. 9B, and the significant features discussed with regard to FIG. 9B are apparent in FIG. 10B as well. As is the case with FIG. 9B, the ease of integration is also seen by FIG. 10B.

In another embodiment, MEMS switches may be used in any application that utilizes switches, whether or not the application also utilizes interferometric modulators. Thus, an entire substrate, such as glass, may be fabricated with MEMS switches for used in various applications. As described further below, these MEMS switches may be used in a manner analogous to transistors. Accordingly, MEMS switches may replace transistors in any application, logic circuits, or controller and driver devices, for example.

Figure 12:
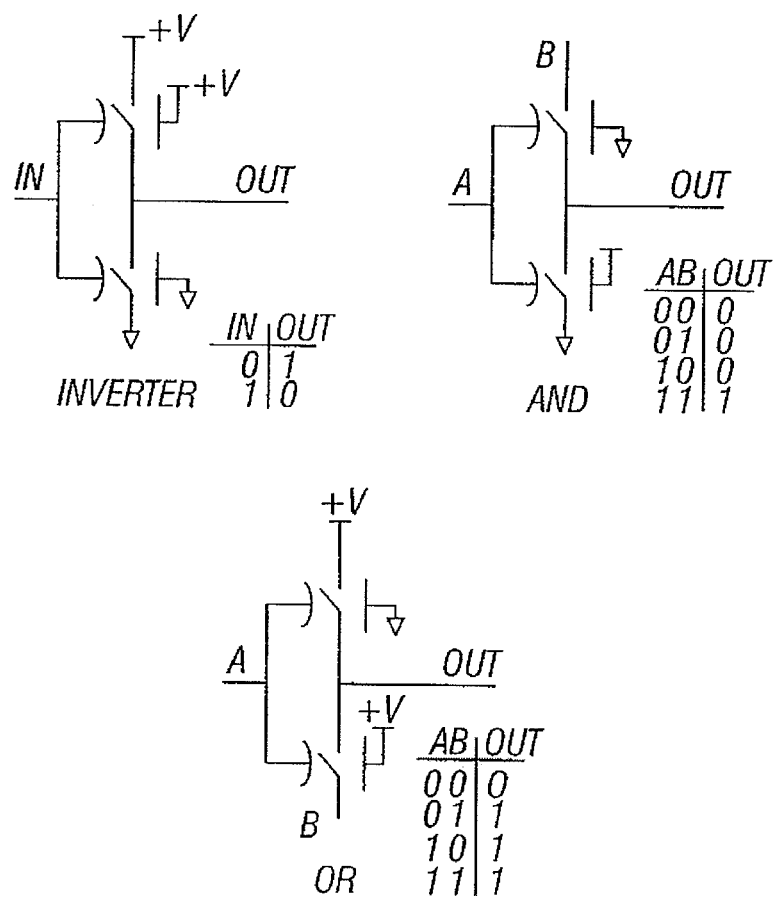
FIG. 12 is an embodiment of an Inverter, AND, and OR logic functions using one type of MEMS switch.

FIG. 12 shows embodiments of logic functions using a MEMS switch. Because the MEMS switch is a 4 terminal device with no intrinsic polarity these logic functions may be implemented with only two switches. The inverter, AND, and OR gates of FIG. 12 each use two MEMS switches with their movable layer connected to the movable layer of the other MEMS switch, forming a first input, and one terminal connected to one terminal of the other MEMS switch, forming an output. In the case of the inverter, a first switch has both its electrode and other terminal connected to supply, and a second switch has both its electrode and other terminal connected to ground. In the case of the AND gate, a first switch has its electrode connected to ground and other terminal connected to a second input, and a second switch has its electrode connected to power and its other terminal connected to ground. In the case of the OR gate, a first switch has its electrode connected to ground and other terminal connected to power, and a second switch has its electrode connected to power and its other terminal connected to a second input. In other embodiments single type MEMS switches can be used to create digital logic functions, such as AND, NAND, NOR, OR, XOR, XNOR, and AOI. Other digital logic functions and combinations are also possible.

Logic blocks comprising MEMS switches may be arranged together to provide logical functions typically found in external components, thereby saving system cost. For example, MEMS switches may be arranged for use in the capacity of low leakage transistors, shift registers, or decoders. In the context of an interferometric modulator display, MEMS switches may be used in conjunction with row drivers or column drivers, for example. Advantageously, MEMS switches may be manufactured on various substrates, such as glass substrates or plastic substrates, for example. The ability to place switches on large area glass substrates is generally less expensive than silicon substrates, providing an advantage over many forms of conventional transistor based logic.

While the above detailed description has shown, described, and pointed out novel features as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others.

What is claimed is:

1. A display device comprising:
a microelectromechanical system (MEMS) display portion having rows and columns of MEMS elements; and
a plurality of MEMS switches formed as one or more additional rows or columns of additional MEMS elements adjacent to the MEMS elements of the display portion, wherein each MEMS switch is configured to selectively electrically connect one of the rows or one of the columns of the display portion to another circuit and to electrically tri-state the one row or column.

2. The device of claim 1, wherein the plurality of MEMS switches forms in part row or column select circuitry.

3. The device of claim 1, wherein the pitch of the MEMS switches substantially matches the pitch of the MEMS elements of the display portion.

4. The device of claim 1, wherein the MEMS switches and the MEMS elements of the display portion include collapsible cavities.

5. The device of claim 1, wherein the MEMS elements of the display portion each include an interferometric cavity.

6. The device of claim 1, wherein the MEMS switches and the MEMS elements of the display portion are at least partially formed with the same manufacturing operations.

7. The device of claim 1, wherein each MEMS switch includes a first terminal connected to one of the rows or one of the columns, a second terminal configured to be connected to another circuit, and a conductive strip configured to move between at least first and second positions.

8. The device of claim 7, wherein the conductive strip is electrically connected to the first and second terminals when in the first position.

9. The device of claim 8, wherein the conductive strip is electrically disconnected from the first and second terminals when in the second position.

10. The device of claim 1, wherein the MEMS switches are disposed adjacent to the display portion.

11. The device of claim 1, further comprising:
a processor that is in electrical communication with the display portion, the processor being configured to process image data; and
a memory device in electrical communication with the processor.

12. The device of claim 11, further comprising:
a driver circuit configured to send at least one signal to the display portion; and
a controller configured to send at least a portion of the image data to the driver circuit.

13. The device of claim 11, further comprising an image source module configured to send the image data to the processor.

14. The device of claim 13, wherein the image source module comprises at least one of a receiver, transceiver, and transmitter.

15. The device of claim 11, further comprising an input device configured to receive input data and to communicate the input data to the processor.

16. A method of manufacturing a display device, the method comprising:
forming a microelectromechanical system (MEMS) display portion comprising rows and columns of MEMS elements; and
forming a plurality of MEMS switches as one or more additional rows or columns of additional MEMS elements adjacent to the MEMS elements of the display portion, wherein each MEMS switch is configured to selectively electrically connect one of the rows or one of the columns of the display portion to another circuit and to electrically tri-state the one row or column.

17. The method of claim 16, wherein the plurality of MEMS switches forms in part row or column select circuitry.

18. The method of claim 16, wherein the pitch of the MEMS switches matches the pitch of the MEMS elements of the display portion.

19. The method of claim 16, wherein the MEMS switches and the MEMS elements of the display portion include collapsible cavities.

20. The method of claim 16, wherein the MEMS elements of the display portion each include an interferometric cavity.

21. The method of claim 16, wherein the MEMS switches and the MEMS elements of the display portion are at least partially formed with the same manufacturing operations.

22. The method of claim 16, wherein forming the plurality of MEMS switches includes forming a first terminal connected to one of the rows or one of the columns, forming a second terminal configured to be connected to another circuit, and forming a conductive strip configured to move between at least first and second positions.

23. The method of claim 22, wherein the conductive strip is electrically connected to the first and second terminals when in the first position.

24. The method of claim 23, wherein the conductive strip is electrically disconnected from the first and second terminals when in the second position.

* * * * *